United States Patent Office 3,204,555
Patented Sept. 7, 1965

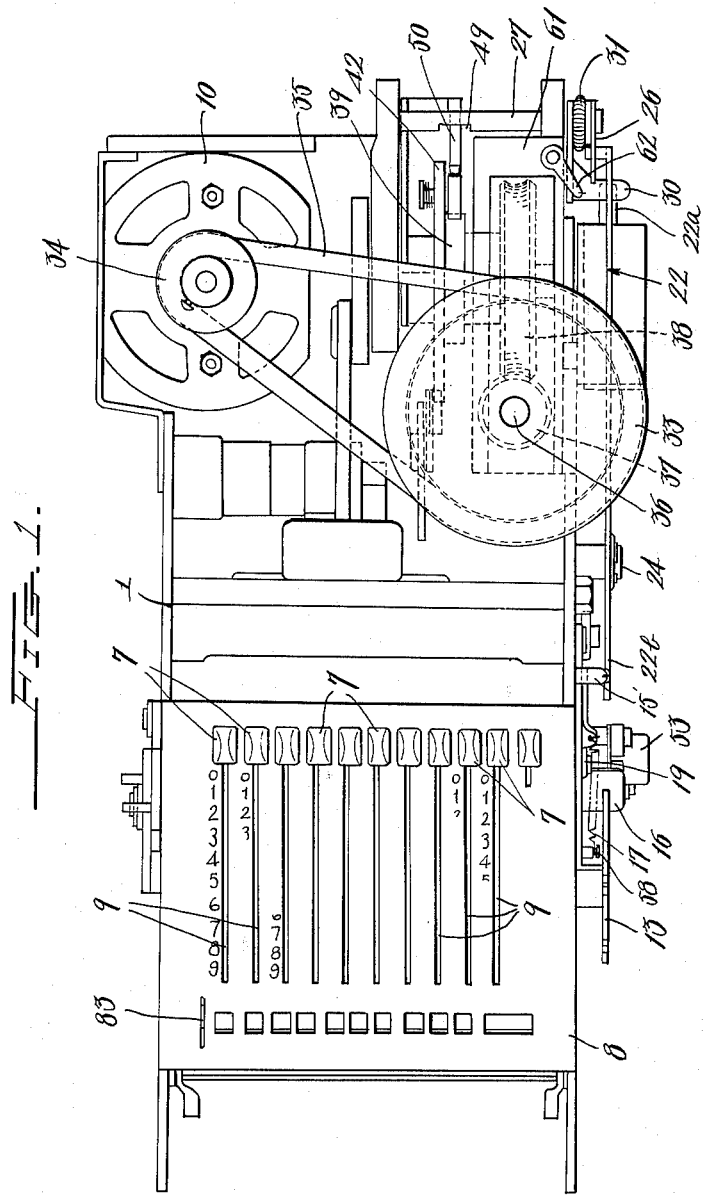

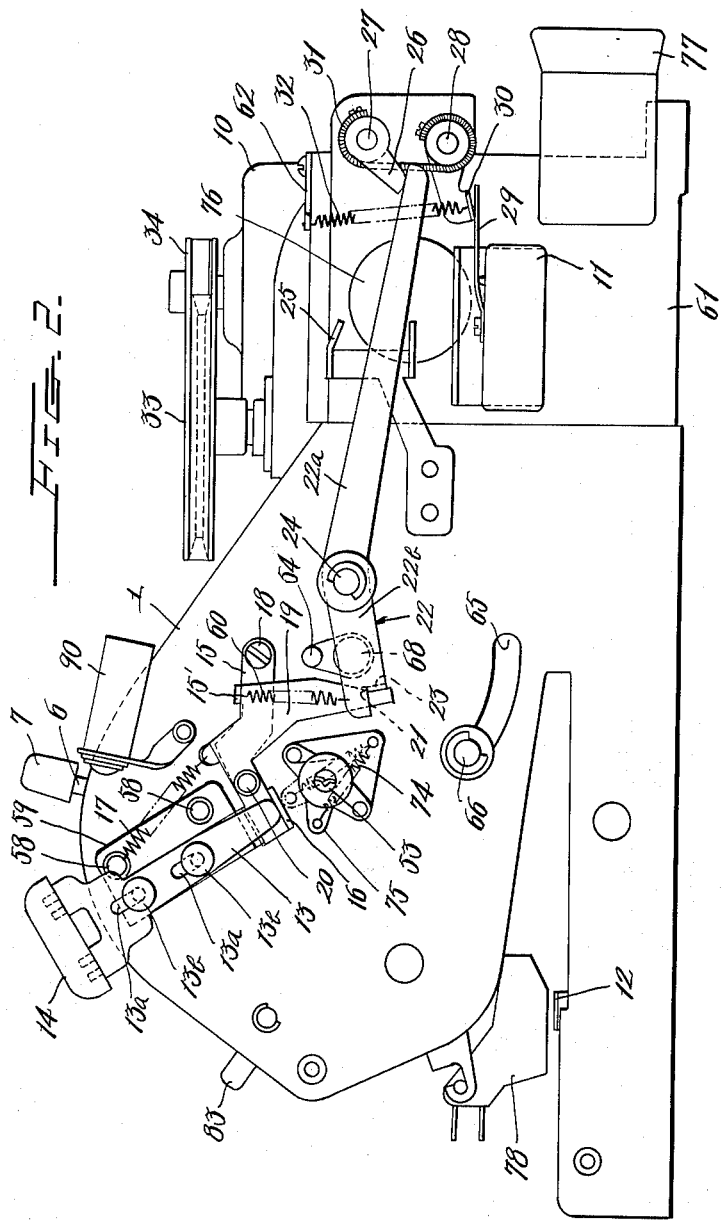

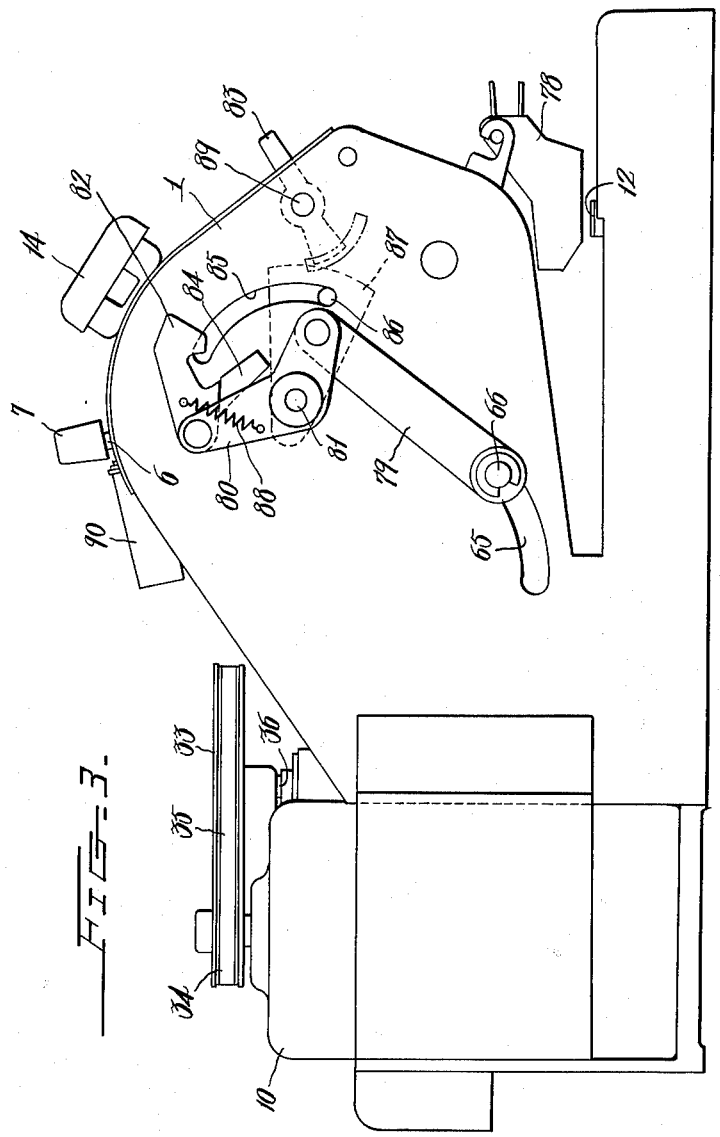

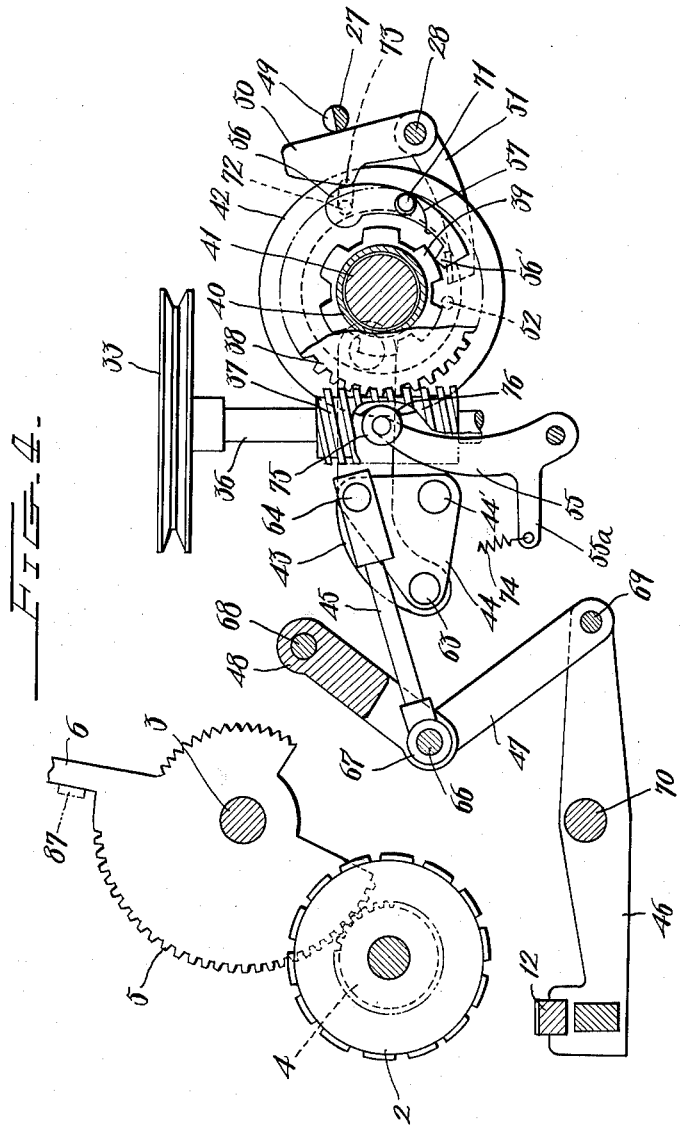

3,204,555
MOTOR-DRIVEN CHECK WRITER
Takayasu Inoue, 838 Rokkakubashi-machi,
Kanagawa-ku, Yokohama, Japan
Filed Mar. 6, 1964, Ser. No. 350,037
Claims priority, application Japan, May 1, 1963,
38/22,303
2 Claims. (Cl. 101—95)

The present invention relates to a check writer adapted for typing numerals and/or characters on check blanks, bills and the like business papers, and more particularly to a motor-driven type check writer useful for the above purpose.

One object of the present invention is to provide an improved type of motor-driven check writer in which after push buttons representing the desired sum are selected and depressed, this sum is typewritten on a check blank by a motor operated typewriting pad or platen, the motor moving the platen with the check thereon into typing contact with the typing disks and then stopping.

Another object of the present invention is to provide an improved check writer which is simpler in its design, and more sturdy and compact in its construction without affecting the above described improved operation.

The above and other objects, features and attendant advantages of the present invention will become apparent to those skilled in the art from a reading of the following detailed explanation of one specific embodiment thereof in conjunction with the accompanying drawings.

In the drawings:

FIG. 1 is a top plane view of a motor-driven check writer embodying the present invention;

FIG. 2 is a right side elevational view of said check writer as shown in FIG. 1;

FIG. 3 is a left side elevational view of said check writer as shown in FIG. 1; and FIG. 4 is a longitudinally cross-sectional view of essential parts of said check writer as shown in FIG. 1.

Now, reference will be had to the accompanying drawings in which one specific embodiment of the present invention is illustrated. The novel motor-driven check writer generally comprises a machine frame 1 which houses essential parts of said check writer. A plurality of typing discs 2 are rotatably mounted on their respective shafts which extend transversely the frame 1 and are supported by any suitable manner by the frame. Each of the type discs 2 has a smaller diameter gear 4 attached on one face thereof. Each gear 4 is engaged by each one mating gear 5 which is supported by a shaft 3. According to the present invention, the number of the mating gears 5 corresponds to that of the typing discs 2. Each gear 5 has an integral operating bar portion 6 provided with a knob 7 at its upper end (FIG. 1). The knobs 7 project out of the grooves 9 formed in a cover plate 8. A series of numeral or character indications are provided along each one groove 9 on the surface of the cover plate 8. When some or all of the knobs 7 are disposed at any selected numeral or character indications, the type discs 2 corresponding to thus positioned knobs 7 are also rotated and the characters of the typing discs 2 which correspond to the numeral or characters selected by the knobs 7 are then disposed right above a common writing platen 12. The above construction is the same as that of a prior art writing machine.

According to the present invention a novel mechanism for actuating the check writer is provided which comprises a motor 10 attached to the machine frame and a switch 11 positioned at a midpoint between said motor 10 and a plug 77 which is adapted to be connected to any suitable electric source, said switch being adapted to be momentarily closed and opened so as to move the writing platen 12 up and down.

Explanation will be now made of the novel actuating mechanism.

In FIG. 2 numeral 13 designates an operating bar having a push button 14 at its upper end and elongated slots 13a along its shaft portion in which the stopper pins 13b of an attachment member 59 are adapted to engage. The attachment member 59 is fixedly secured by means of set screws 58 to the frame 1 so that the operating bar 13 may slide on the attachment member 59. The lower end of the operating bar 13 bears against the angle portion 16 of an intermediate operating member 15, normally holding push button 14 in its raised position through the action of spring 17 extending between the attachment member 59 and the operating member 15. One end of 14 is normally held in its raised position. One end of the intermediate operating member 15 is pivotally held on the machine frame 1 by set screw 18 and the other end of the operating member 15 (adjacent projecting angle portion 16) has a connecting piece 19 pivotally connected thereto by means of a pin 20. The above-mentioned spring 17 extends between the connecting piece 19 and the upper screw 58 on the attachment member 59. The connecting piece 19 has a notch 21 at its lower end in which the bent portion 23 of an operating lever 22 is adapted to be retained. The retention of the bent portion 23 in the notch 21 may be assisted by the action of a spring 60 extending between a projecting portion 15' integrally formed on the intermediate operating piece 15 and the base end of the operating lever 22. Immediately after operating lever 22 has performed its designated operation, it is adapted to return to the position shown in FIG. 2 by action of detaching stud 54, the operation of which will be explained below.

The operating lever 22 consists of a longer fore portion 22a and a shorter base portion 22b and is pivotally mounted at the connecting point 24 of the two portions. The upward and downward movement of the lever 22 is restricted by a U-shaped limiting means 25. The tip of the fore portion 22a opposes a switch operating means 26. A shaft 28 is disposed right below the supporting shaft 27 for the switch operating piece 26 and supports a depressing lever 30 which is adapted to bear against the elastic operating piece 29 of the switch 11. The shafts 27 and 28 are connected to each other by means of a spring belt 31. A spring 32 extends between the depressing lever 30 and a supporting piece 62 which is secured to a bearing frame 61 provided behind the machine frame 1. The spring 32 is so arranged that when the shaft 27 rotates in one direction the shaft 28 also rotates in the same direction and when the spring 31 is in inoperative position the fore portion 22a of the lever 22 holds down the elastic operating piece 29 against the action of the spring 32 so that the switch is held open.

Numeral 33 designates a pulley which is actuated in cooperation with a pulley 34 mounted on the motor 10 by means of a belt 35 and the pulley 33 is mounted on the top of a vertical shaft 36 and the vertical shaft 36 has also a worm 37 fixedly secured thereto in a spaced relation with the pulley 33 (see FIG. 4). The worm 37 is engaged by a worm wheel 38 and a toothed clutch 39 is fixedly secured through a rim 40 to one face thereof. The worm wheel 38 is mounted on a supporting shaft 41 to which a driving disc 42 for the typing platen 12 is fixedly secured. Pivoted on the opposite sides of the driving disc 42 are an eccentrically mounted connecting bar 43 and a pawl bar 56. The fore end portion of the connecting bar 43 slopes downwardly and the extreme end of the connecting bar 43 is connected by means of a pin 63 to a triangular-shape plate 44 supported by a shaft 44'. A connecting bar 45 is pivotally connected, by means of a pin 64 to the triangular-shape plate 44.

The other end of the connecting bar 45 is formed with a ring 67. The ring 67 is mounted on a shaft 66 which is adatped to be guided within a crescent-shape slot 65 (see FIG. 3) for limited movement therein. The shaft 66 also supports an intermediate link 47 and a hanging bar 48 which pivots about the supporting shaft 68 of the above mentioned detaching stud or bar 54. Link 47 and bar 48 together constitute a toggle joint. The intermediate lever 47 is connected by means of a pin 69 to the rear end of a lever 46 which supports the platen 12 at its fore end. The supporting lever 46 is pivoted at 60 between its opposite ends. When the connecting bar 43 is pulled due to the rotation of the driving disc 42 and the connecting bar 45 is pulled to the right as it is shown in FIG. 4 through the triangular-shape plate 44, the hanging bar 48 pivots about the shaft 68, and accordingly, the intermediate lever 47 descends as indicated with the arrow in FIG. 4 so as to actuate the supporting lever 46 whereby the platen 12 rises up to print the selected numerals and/or characters on a sheet or check blank disposed right below the typing discs 2. In this case the rotation of the shaft 68 causes the detaching stud 54 to eccentrically move (see FIG. 2) to prevent the bent portion 23 of the lever 22 from engaging in the notch 21 of the connecting piece 19 thereby to avoid duplicate type-writing.

The shaft 27 is provided with a notch 49 in which a lever 50 is adapted to engage. The lever 50 is mounted on the shaft 28 and strikes against the pawl bar 56. The pawl bar 56 is pivoted by means of a pin 71 on the driving disc 42 and has a pin 72 at its fore end which is adapted to engage in an elongated slot 73 in the driving disc 42. The pawl bar pin 72 moves about within the slot 73 so as to engage with or disengage from the toothed clutch 39. The shaft 28 has a stopper lever 51 secured thereto and the fore end of the lever 51 is engaged by a projection 52 extending from the surface of the driving disc 42.

Numeral 55 designates a stopper lever for the driving disc 42 and the lever 55 has an extension piece 55a on which a tension spring 74 acts. The stopper lever 55 is further provided with a roll 75 at one end thereof and the spring 74 urges the roll 75 into a recess 76 formed in the circumferential edge of the driving disc 42 thereby to stabilize the disc 42. Numeral 53 (FIG. 2) designates a lock member in which a pin is to be inserted to rotate a locking bar 75 having a spring 74. When the locking bar 75 is rotated it abuts against the under surface of the bent piece 16 of the intermediate operating member 15 so as to prevent the downward movement of the operating bar 13. In this case, the operating bar 13 does not operate even if the push button 14 is depressed. Numeral 76 designates a bearing, 78 is an ink pad supporting frame, and 79 is an operating lever for returning the operating bar 6. One end of the lever 79 is connected to the shaft 66 and the other end of the lever 79 is connected to the L-shaped piece 80 which is mounted to pivot about a shaft 81 and which includes a hook piece 82 on which a spring 88 acts. The hook piece 82 catches the projection 86 of the returning frame 8 which projection is positioned in the crescent-shaped slot 85 formed in the frame 1 to return the operating bars 6 and the typing discs 2 to their original positions. The hook piece 82 can be disengaged from the projection 86 by means of a pawl 84. The returning movement of the operating bar and type discs can be stopped by the manipulation of a knob 83. In order to stop the returning movement, the knob 83 is pivoted about a pin 89 so that the fore end of the knob strikes against the returning frame 87 thereby to prevent the frame 87 from rotation. A pilot lamp 90 is mounted on the frame 1 and the lamp 90 is adapted to be lighted when the plug 77 is connected to the electric source.

In the operation of the check writer according to the present invention, firstly types representing a sum to be typewritten are selected and a check blank is disposed between the typing discs 2 and typewriting platen 12 and then the push button 14 is depressed. Upon depression of the push button 14, the operating lever 22 is actuated to push the switch operating piece 26 upwardly, and accordingly, the shaft 27 is caused to rotate one fourth of the angular distance of one complete revolution so as to move the notch 49 of the shaft 27 from the position as shown in FIG. 4 to the position in which the notch 49 opposes the lever 50. Since the shaft 28 is rotated by the spring belt 31 and spring 32 to raise the depressing lever 30 the latter is disengaged from the elastic piece 29 to close the switch 11. Since the lever 50 is urged into the notch 49 by the action of the spring 57 which acts on the pawl bar 56, the fore end 56' of the pawl bar 56 abuts against the peripheral surface of the toothed clutch 39. The closing of the switch 11 causes the motor 10 to rotate and it in turn rotates the worm wheel 38 and the toothed clutch 39, and the fore end 56' of the pawl bar 56 engages with the toothed clutch by the action of the spring 57. When the projection 52 on the worm wheel 38 moves round, the driving disc 42 is caused to rotate through the engagement of the toothed clutch 39 with the pawl bar 56. The rotation of the driving disc 42 pushes the typewriting platen 12 upwardly through the connecting bars 43, 45, intermediate bar 47 and supporting lever 46 so as to press the check blank against the type of disc 2. Thereafter, the projection 52 of the driving disc 42 depresses the lever 51 so as to rotate the shaft 28 counterclockwise as shown in FIGS. 2 and 4 whereby the depressing lever 30 is pushed down against the action of the spring 32 and spring belt 31. Therefore, the switch 11 is disconnected and the shaft 27 is caused to rotate so as to return the notch 49 to the position as shown in FIG. 4, the lever 50 stabilizes the pawl bar 56 in its depressed position and the fore end 56' of the pawl bar 56 is disengaged from the toothed clutch 39.

The stud 54 which moves along a sector path is actuated simultaneously with the supporting lever 46 (through rotation of shafts 68) so as to disengage the connecting piece 19 from the base portion 22b of the operating bar 22, therefore, even if the push button 14 is continuously held in its depressed position the typewriting platen 12 is allowed to have only a single vertically reciprocal movement whereby duplicate typewriting action by the platen can be avoided.

With the above arrangement of the novel check writer by the present invention, the typewriting operation on such a check writer can be positively carried out by merely depressing the push button and furthermore, such an operation can be promptly performed.

It should be understood that modifications and variations on the embodiment of the invention as disclosed herein and illustrated in the drawing may be resorted to without departing from the scope of the concept of the present invention. Therefore, the scope of the invention should be limited only by the scope and proper interpretation of the claims appended herto.

What is claimed is:

1. In a check writer of the kind having a plurality of typing discs, each of which has a series of type characters on the periphery thereof and a series of gear teeth at one side surface thereof, mating gear means for the gear teeth of said discs having gears engaging and corresponding in number to the gears of said discs, said mating gear means having operating bars and knobs at an upper portion thereof, a typewriting platen common to all said typing discs and lever means to move the platen vertically to press a check against the selected type characters of the typing discs, the motor operated structure comprising, a motor, speed reducing means connected to said motor, a driving disc, a toothed clutch means connecting said speed reducing means to said driving disc, an eccentrically mounted shaft on said driving disc and a toggle joint connected to said shaft for operating said typing platen,
a microswitch for controlling the operation of said motor,
means for normally holding said microswitch in open position comprising
  a pair of rotatable shafts connected by a spring belt to rotate in the same direction
  projecting means on a first shaft of said pair of shafts to hold said microswitch in open position,
  lever means secured to said first shaft and having an arm extending up to and in contact with said second shaft to normally hold said first shaft in the position wherein the projecting means of the first shaft holds the microswitch in open position,
  said second shaft being constructed to release said lever means upon partial rotation thereof to permit limited rotation of said first shaft and thereby release said projecting means to close said switch of said motor,
push button means comprising two levers connected in series for rotating said second shaft to start the operation of said motor,
said driving disk comprising a pawl means for establishing the driving connection to said toothed clutch,
said lever means of said first shaft being constructed to release said pawl means for contact with the toothed clutch when said lever means is released by rotation of said second shaft,
means on said driving disk adapted to detach said pawl means from contact with said toothed clutch when it completes one revolution.

2. The check writer as claimed in claim 1, wherein said two levers are detachably connected and wherein said toggle joint for operating said platen comprises a pivotable shaft in fixed position, means on said pivotable shaft adapted to disconnect the two levers of said push button means while said toggle joint moves the platen to printing position.

UNITED STATES PATENTS
References Cited by the Examiner

| | | | |
|---|---|---|---|
| 2,122,536 | 7/38 | Payne | 101—95 |
| 2,707,432 | 5/55 | Rindfleisch | 101—95 |
| 2,794,387 | 6/57 | Schultz | 101—20 |
| 2,869,456 | 1/59 | Little | 101—95 |

WILLIAM B. PENN, *Primary Examiner.*